(12) United States Patent
Gao et al.

(10) Patent No.: US 11,635,988 B1
(45) Date of Patent: Apr. 25, 2023

(54) OPTIMAL NUMBER OF THREADS DETERMINATION SYSTEM

(71) Applicant: SAS Institute Inc., Cary, NC (US)

(72) Inventors: Yan Gao, Cary, NC (US); Joshua David Griffin, Harrisburg, NC (US); Yu-Min Lin, Raleigh, NC (US); Yan Xu, Cary, NC (US); Seyedalireza Yektamaram, Rotterdam (NL); Amod Anil Ankulkar, Pune (IN); Aishwarya Sharma, Mumbai (IN); Girish Vinayak Kolapkar, Pune (IN); Kiran Devidas Bhole, Pune (IN); Kushawah Yogender Singh, Mumbai (IN); Jorge Manuel Gomes da Silva, Durham, NC (US)

(73) Assignee: SAS Institute Inc., Cary, NC (US)

( * ) Notice: Subject to any disclaimer, the term of this patent is extended or adjusted under 35 U.S.C. 154(b) by 0 days.

(21) Appl. No.: 17/820,952

(22) Filed: Aug. 19, 2022

Related U.S. Application Data

(63) Continuation of application No. 17/867,903, filed on Jul. 19, 2022, now abandoned.
(Continued)

(30) Foreign Application Priority Data

Jun. 6, 2022 (IN) .............................. 202211032304

(51) Int. Cl.
*G06F 9/455* (2018.01)
*G06F 9/48* (2006.01)
*G06N 20/10* (2019.01)

(52) U.S. Cl.
CPC ........... *G06F 9/4881* (2013.01); *G06N 20/10* (2019.01)

(58) Field of Classification Search
CPC .............................. G06F 9/4881; G06N 20/10
See application file for complete search history.

(56) References Cited

U.S. PATENT DOCUMENTS

| | | |
|---|---|---|
| 9,189,233 B2 | 11/2015 | Sasanka et al. |
| 9,529,574 B2 | 12/2016 | Gonion |

(Continued)

FOREIGN PATENT DOCUMENTS

EP 3812900 4/2021

OTHER PUBLICATIONS

SAS Institute Inc. 2019. SAS® Visual Data Mining and Machine Learning 8.5: Procedures. Cary, NC: SAS Institute Inc.
(Continued)

*Primary Examiner* — Wissam Rashid
(74) *Attorney, Agent, or Firm* — Bell & Manning, LLC

(57) ABSTRACT

A computing device determines an optimal number of threads for a computer task. Execution of a computing task is controlled in a computing environment based on each task configuration included in a plurality of task configurations to determine an execution runtime value for each task configuration. An optimal number of threads value is determined for each set of task configurations having common values for a task parameter value, a dataset indicator, and a hardware indicator. The optimal number of threads value is an extremum value of an execution parameter value as a function of a number of threads value. A dataset parameter value is determined for a dataset. A hardware parameter value is determined as a characteristic of each distinct executing computing device in the computing environment. The optimal number of threads value for each set of task configurations is stored in a performance dataset in association with the common values.

30 Claims, 8 Drawing Sheets

Related U.S. Application Data

(60) Provisional application No. 63/326,642, filed on Apr. 1, 2022, provisional application No. 63/320,156, filed on Mar. 15, 2022.

(56) References Cited

U.S. PATENT DOCUMENTS

| | | | |
|---|---|---|---|
| 2021/0158512 A1* | 5/2021 | Sun | A61B 5/7264 |
| 2022/0303176 A1* | 9/2022 | Pandey | G06F 8/447 |

OTHER PUBLICATIONS

SAS Institute Inc. 2019. SAS® Visual Statistics 8.5: Procedures. Cary, NC: SAS Institute Inc.

Egger, Markus. "How Many Threads Do You Need?" Online Code Magazine: Publisher's Point. Feb. 19, 2019. pp. 1-14.

"Optimum Number of Threads While Multitasking." Superuser. com. 2013. pp. 1-4.

"Recommended Threading Strategies and OS Platform." Endeca MDEX Engine Installation Guide. Version 6.1.4. Dec. 2010. pp. 1.

"Destroying the Myth of 'number of threads = number of physical cores.'" Data Science & Design. Apr. 15, 2017. pp. 1-28.

\* cited by examiner

__US 11,635,988 B1__

OPTIMAL NUMBER OF THREADS DETERMINATION SYSTEM

CROSS-REFERENCE TO RELATED APPLICATIONS

The present application claims the benefit of and priority under 35 U.S.C. § 119(e) to U.S. Provisional Patent Application No. 63/326,642 filed Apr. 1, 2022 and to U.S. Provisional Patent Application No. 63/320,156 filed Mar. 15, 2022, the entire contents of which are hereby incorporated by reference. The present application also claims the benefit of and priority under 35 U.S.C. § 119(e) to Indian Provisional Patent Application No. 202211032304 filed Jun. 6, 2022, the entire contents of which are hereby incorporated by reference. The present application is also a continuation of U.S. patent application Ser. No. 17/867,903 that was filed Jul. 19, 2022, the entire contents of which are hereby incorporated by reference. U.S. patent application Ser. No. 17/867,903 claims the benefit of and priority under 35 U.S.C. § 119(e) to U.S. Provisional Patent Application No. 63/326,642 filed Apr. 1, 2022, to U.S. Provisional Patent Application No. 63/320,156 filed Mar. 15, 2022, and to Indian Provisional Patent Application No. 202211032304 filed Jun. 6, 2022.

BACKGROUND

Machine learning systems can be trained and executed using one or more threads distributed across one or more computing devices. Typically, a user of the machine learning system can select a value for the number of threads though default values may be defined and used automatically when not selected by the user. The user typically does not know what number of threads is optimal to use based on the model being trained and/or executed, on the hardware available to perform the training and/or execution, and on the dataset being used to train the model. A default value or user specified value may be used though it may result in slower execution times, unnecessary use of computing resources, and/or increased computer memory usage.

SUMMARY

In an example embodiment, a non-transitory computer-readable medium is provided having stored thereon computer-readable instructions that when executed by a computing device, cause the computing device to determine an optimal number of threads for a computer task. Execution of a computing task is controlled in a computing environment based on each task configuration included in a plurality of task configurations to determine an execution runtime value for each task configuration. Each task configuration of the plurality of task configurations includes a task parameter value, a dataset indicator, a hardware indicator, and a number of threads value. The task parameter value is an input to the computing task. The dataset indicator indicates a dataset to use when executing the computing task. The hardware indicator indicates an executing computing device in the computing environment used to execute the computing task. The number of threads value indicates a number of threads to use to execute the computing task using the executing computing device. An optimal number of threads value is determined for each set of task configurations in the plurality of task configurations that have common values for the task parameter value, the dataset indicator, and the hardware indicator, wherein the optimal number of threads value is determined as an extremum value of an execution parameter value as a function of the number of threads value. A dataset parameter value is determined for the dataset. A hardware parameter value is determined as a characteristic of each distinct executing computing device in the computing environment indicated using the hardware indicator. The determined optimal number of threads value for each set of task configurations in the plurality of task configurations that have common values for the task parameter value, the dataset parameter value, and the hardware parameter value is stored in a performance dataset in association with the common values for the task parameter value, the dataset parameter value, and the hardware parameter value.

In another example embodiment, a computing device is provided. The computing device includes, but is not limited to, a processor and a non-transitory computer-readable medium operably coupled to the processor. The computer-readable medium has instructions stored thereon that, when executed by the processor, cause the computing device to determine an optimal number of threads for a computer task.

In yet another example embodiment, a method of determining an optimal number of threads for a computer task is provided.

Other principal features of the disclosed subject matter will become apparent to those skilled in the art upon review of the following drawings, the detailed description, and the appended claims.

BRIEF DESCRIPTION OF THE DRAWINGS

Illustrative embodiments of the disclosed subject matter will hereafter be described referring to the accompanying drawings, wherein like numerals denote like elements.

DETAILED DESCRIPTION

A thread determination application 122 determines an optimal number of threads to execute a computing task under various conditions that include task parameters, dataset parameters, and hardware parameters. An illustrative computing task is training of a machine learning model. The optimal number of threads determined for each condition can be used to train a thread determination machine learning model to predict the optimal number of threads under conditions not tested. For illustration, the thread determination machine learning model may be a decision tree. From the trained decision tree, a ruleset may be defined and used to specify the number of threads to use when a user executes the computing task. The computing task may be executed with the specified number of threads to reduce an amount of a computing resource used. For example, the computing resource may be an amount of memory required, an execution time, etc.

Figure 1:
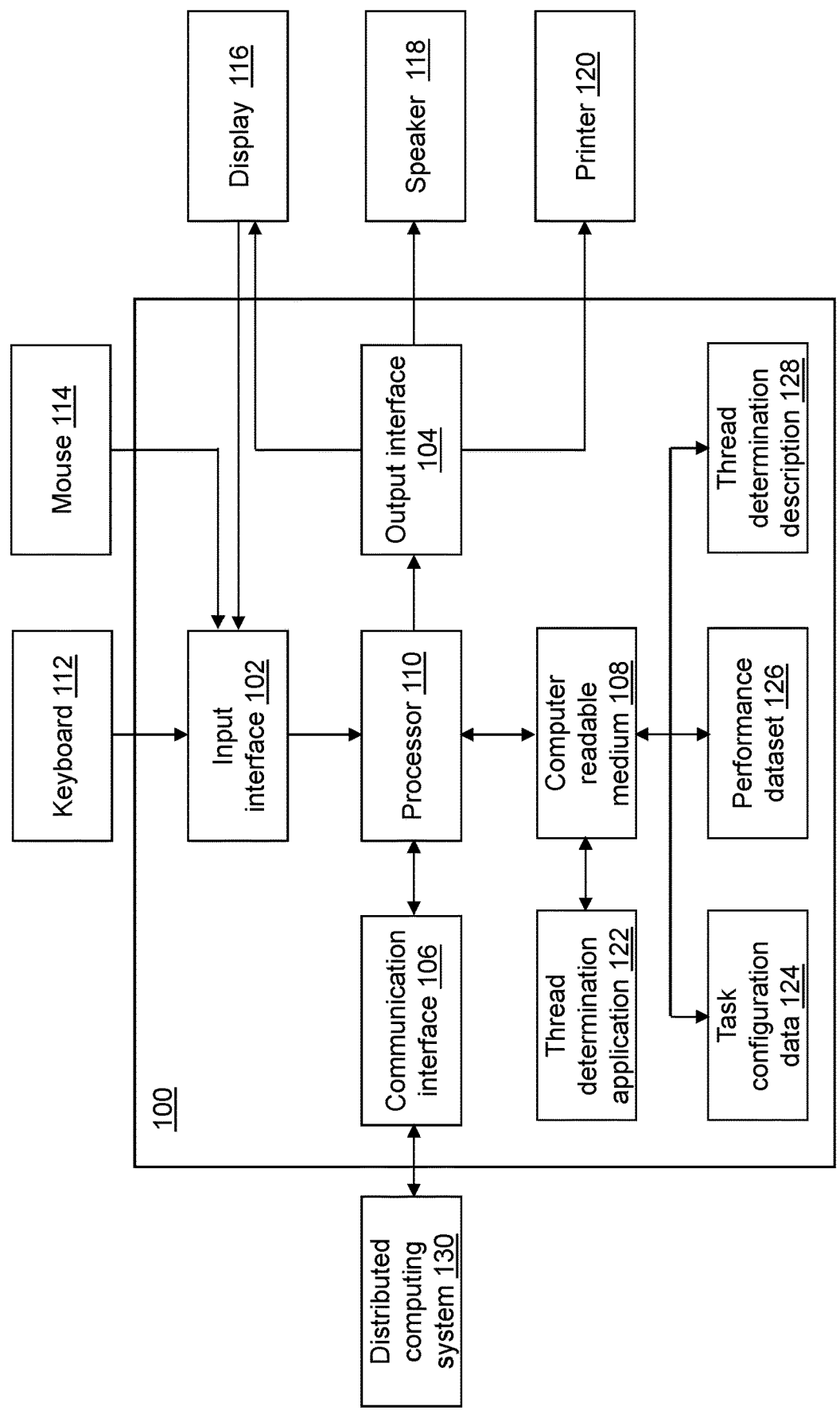
FIG. 1 depicts a block diagram of a thread determination device in accordance with an illustrative embodiment.

Referring to FIG. 1, a block diagram of a thread determination device 100 is shown in accordance with an illustrative embodiment. Thread determination device 100 may include an input interface 102, an output interface 104, a communication interface 106, a non-transitory computer-readable medium 108, a processor 110, thread determination application 122, task configuration data 124, a performance dataset 126, and thread determination description 128. Fewer, different, and/or additional components may be incorporated into thread determination device 100.

Thread determination application 122 executes a computing task using a plurality of task configurations with different numbers of threads and determines a computing time required for each computing task execution. An optimal number of threads is determined for each task configuration having common values except for the number of threads used. The optimal number of threads may be determined by finding a maximum computing time speedup or a minimum computing time using a polynomial equation defined by fitting a curve. A thread determination predictive model may be trained to predict the optimal number of threads when the computing task is executed with different task configurations to reduce the amount of the computing resource used as demonstrated by results provided herein.

Input interface 102 provides an interface for receiving information from the user or another device for entry into thread determination device 100 as understood by those skilled in the art. Input interface 102 may interface with various input technologies including, but not limited to, a keyboard 112, a mouse 114, a display 116, a track ball, a keypad, one or more buttons, etc. to allow the user to enter information into thread determination device 100 or to make selections presented in a user interface displayed on display 116.

The same interface may support both input interface 102 and output interface 104. For example, display 116 comprising a touch screen provides a mechanism for user input and for presentation of output to the user. Thread determination device 100 may have one or more input interfaces that use the same or a different input interface technology. The input interface technology further may be accessible by thread determination device 100 through communication interface 106.

Output interface 104 provides an interface for outputting information for review by a user of thread determination device 100 and/or for use by another application or device. For example, output interface 104 may interface with various output technologies including, but not limited to, display 116, a speaker 118, a printer 120, etc. Thread determination device 100 may have one or more output interfaces that use the same or a different output interface technology. The output interface technology further may be accessible by thread determination device 100 through communication interface 106.

Communication interface 106 provides an interface for receiving and transmitting data between devices using various protocols, transmission technologies, and media as understood by those skilled in the art. Communication interface 106 may support communication using various transmission media that may be wired and/or wireless. Thread determination device 100 may have one or more communication interfaces that use the same or a different communication interface technology. For example, thread determination device 100 may support communication using an Ethernet port, a Bluetooth antenna, a telephone jack, a USB port, etc. Data and/or messages may be transferred between thread determination device 100 and another computing device of a distributed computing system 130 using communication interface 106.

Computer-readable medium 108 is an electronic holding place or storage for information so the information can be accessed by processor 110 as understood by those skilled in the art. Computer-readable medium 108 can include, but is not limited to, any type of random access memory (RAM), any type of read only memory (ROM), any type of flash memory, etc. such as magnetic storage devices (e.g., hard disk, floppy disk, magnetic strips, . . . ), optical disks (e.g., compact disc (CD), digital versatile disc (DVD), . . . ), smart cards, flash memory devices, etc. Thread determination device 100 may have one or more computer-readable media that use the same or a different memory media technology. For example, computer-readable medium 108 may include different types of computer-readable media that may be organized hierarchically to provide efficient access to the data stored therein as understood by a person of skill in the art. As an example, a cache may be implemented in a smaller, faster memory that stores copies of data from the most frequently/recently accessed main memory locations to reduce an access latency. Thread determination device 100 also may have one or more drives that support the loading of a memory media such as a CD, DVD, an external hard drive, etc. One or more external hard drives further may be connected to thread determination device 100 using communication interface 106.

Processor 110 executes instructions as understood by those skilled in the art. The instructions may be carried out by a special purpose computer, logic circuits, or hardware circuits. Processor 110 may be implemented in hardware and/or firmware. Processor 110 executes an instruction, meaning it performs/controls the operations called for by that instruction. The term "execution" is the process of running an application or the carrying out of the operation called for by an instruction. The instructions may be written using one or more programming language, scripting language, assembly language, etc. Processor 110 operably couples with input interface 102, with output interface 104, with communication interface 106, and with computer-readable medium 108 to receive, to send, and to process information. Processor 110 may retrieve a set of instructions from a permanent memory device and copy the instructions in an executable form to a temporary memory device that is generally some form of RAM. Thread determination device 100 may include a plurality of processors that use the same or a different processing technology.

Some machine-learning approaches may be more efficiently and speedily executed and processed with machine-learning specific processors (e.g., not a generic central processing unit (CPU)). Such processors may also provide additional energy savings when compared to generic CPUs. For example, some of these processors can include a graphical processing unit, an application-specific integrated circuit, a field-programmable gate array, an artificial intelligence accelerator, a purpose-built chip architecture for machine learning, and/or some other machine-learning specific processor that implements a machine learning approach using semiconductor (e.g., silicon, gallium arsenide) devices. These processors may also be employed in heterogeneous computing architectures with a number of and a variety of different types of cores, engines, nodes, and/or layers to achieve additional various energy efficiencies, processing speed improvements, data communication speed improvements, and/or data efficiency targets and improvements throughout various parts of the system.

Thread determination application 122 may perform operations associated with creating performance dataset 126 and with defining thread determination description 128 by executing a computing task with each task configuration included in task configuration data 124 that includes a plurality of task configurations that may also be referred to as a set of task configurations. Some or all of the operations described herein may be embodied in thread determination application 122. The operations may be implemented using hardware, firmware, software, or any combination of these methods.

Referring to the example embodiment of FIG. 1, thread determination application 122 is implemented in software (comprised of computer-readable and/or computer-executable instructions) stored in computer-readable medium 108 and accessible by processor 110 for execution of the instructions that embody the operations of thread determination application 122. Thread determination application 122 may be written using one or more programming languages, assembly languages, scripting languages, etc. Thread determination application 122 may be integrated with other analytic tools. As an example, thread determination application 122 may be part of an integrated data analytics software application and/or software architecture such as that offered by SAS Institute Inc. of Cary, N.C., USA. Merely for illustration, thread determination application 122 may be implemented using or integrated with one or more SAS software tools such as Base SAS, SAS® Enterprise Miner™, SAS® Event Stream Processing, SAS/STAT®, SAS® High Performance Analytics Server, SAS® Visual Data Mining and Machine Learning, SAS® LASR™, SAS® In-Database Products, SAS® Scalable Performance Data Engine, SAS® Cloud Analytic Services (CAS), SAS/OR®, SAS/ETS®, SAS® Visual Analytics, SAS® Viya™, and SAS In-Memory Statistics for Hadoop®, etc. all of which are developed and provided by SAS Institute Inc. of Cary, N.C., USA. Data mining, statistical analytics, and response prediction are practically applied in a wide variety of industries to solve technical problems.

Thread determination application 122 may be implemented as a Web application. For example, thread determination application 122 may be configured to receive hypertext transport protocol (HTTP) responses and to send HTTP requests. The HTTP responses may include web pages such as hypertext markup language (HTML) documents and linked objects generated in response to the HTTP requests. Each web page may be identified by a uniform resource locator (URL) that includes the location or address of the computing device that contains the resource to be accessed in addition to the location of the resource on that computing device. The type of file or resource depends on the Internet application protocol such as the file transfer protocol, HTTP, H.323, etc. The file accessed may be a simple text file, an image file, an audio file, a video file, an executable, a common gateway interface application, a Java applet, an extensible markup language (XML) file, or any other type of file supported by HTTP.

Figure 2:
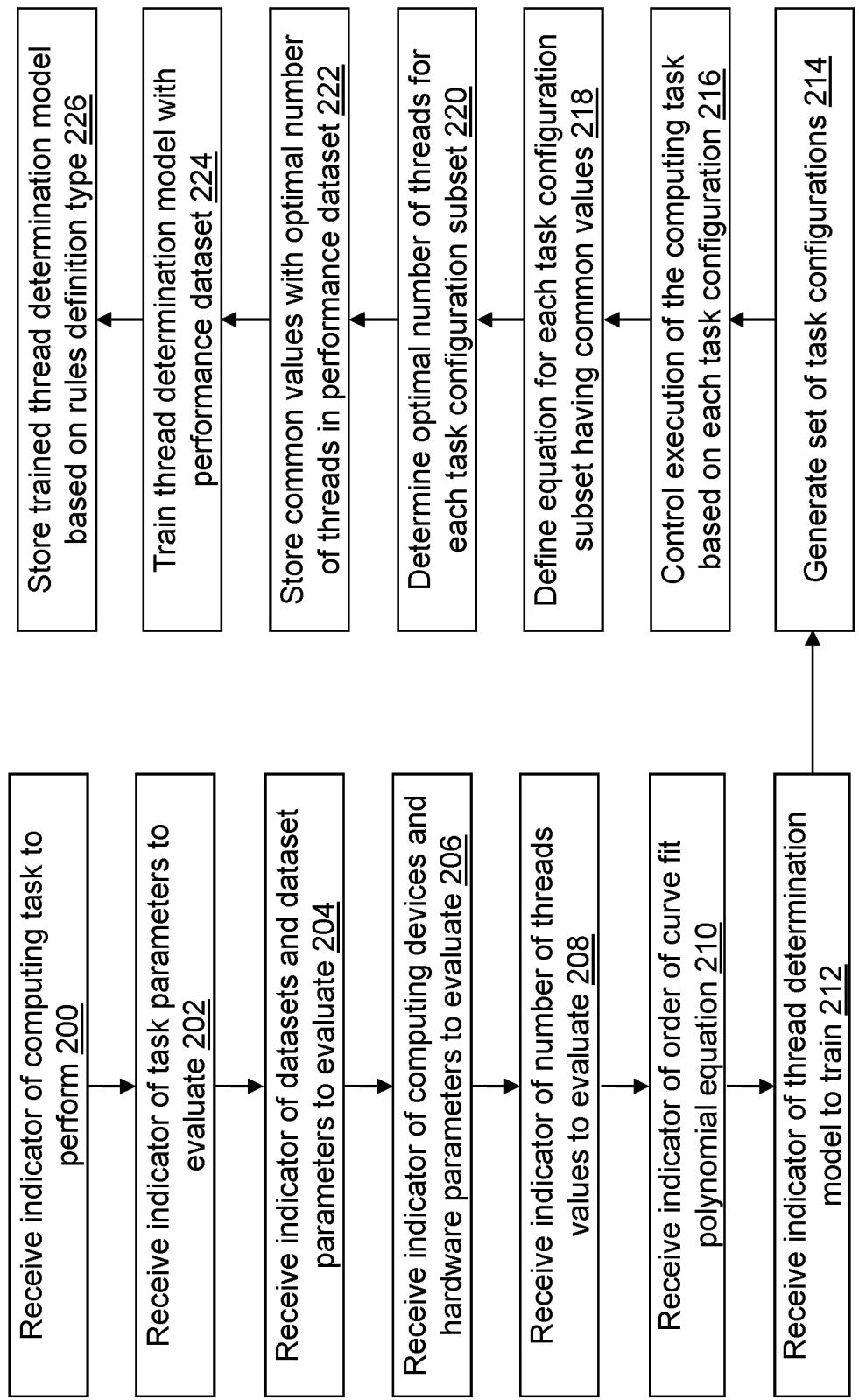
FIG. 2 depicts a flow diagram illustrating examples of operations performed by a thread determination application of the thread determination device of FIG. 1 in accordance with an illustrative embodiment.

Referring to FIG. 2, example operations associated with thread determination application 122 are described. Additional, fewer, or different operations may be performed depending on the embodiment of thread determination application 122. The order of presentation of the operations of FIG. 2 is not intended to be limiting. Some of the operations may not be performed in some embodiments. Although some of the operational flows are presented in sequence, the various operations may be performed in various repetitions and/or in other orders than those that are illustrated. For example, a user may execute thread determination application 122, which causes presentation of a first user interface window, which may include a plurality of menus and selectors such as drop-down menus, buttons, text boxes, hyperlinks, etc. associated with thread determination application 122 as understood by a person of skill in the art. The plurality of menus and selectors may be accessed in various orders. An indicator may indicate one or more user selections from a user interface, one or more data entries into a data field of the user interface, one or more data items read from a command line, one or more data items read from computer-readable medium 108, or one or more data items otherwise defined with one or more default values, etc. that are received as an input by thread determination application 122. Some of the operational flows further may be performed in parallel, for example, using a plurality of threads and/or a plurality of computing devices such as may be included in distributed computing system 130.

In an operation 200, a first indicator may be received that indicates a computing task. For example, the first indicator indicates a name of a machine learning model to train as well as the training parameter and hyperparameter values to use to train the machine learning model. Thus, the first indicator describes a computing task that may be to train a machine learning model type. The first indicator may indicate different types of computing tasks that include hyperparameters. For illustration, the machine learning model may perform prediction such as determining a predicted class or label for each observation vector of an input dataset. As an example, the first indicator may be received by thread determination application 122 after selection from a user interface window or after entry by a user into a user interface window. A machine learning model type may be selected from "K-Clustering", "Decision Tree", "Factorization Machine", "Forest", "Gradient Boosting", "Neural Network", ""Support Vector Machine", etc. The model type indicated by "K-Clustering" may refer to a k-means clustering model type. The model type indicated by "Decision Tree" may refer to a decision tree model type. The model type indicated by "Factorization Machine" may refer to a factorization machine model type. The model type indicated by "Forest" may refer to a random forest model type. The model type indicated by "Gradient Boosting" may refer to a gradient boosting model type. The model type indicated by "Neural Network" may refer to a neural network model type. The model type indicated by "Support Vector Machine" may refer to a support vector machine (SVM) model type. The model type may be labeled or selected in a variety of different manners by the user as understood by a person of skill in the art.

The first indicator may further indicate one or more hyperparameters to use for training and validating the indicated model type and/or values for an automatic tuning method (autotune option) as well as other training options such as an objective function, training stop criteria, etc. Hyperparameters define values or various options that govern a training process based on the model type. The default values of these hyperparameters may not be suitable for all applications. To reduce the effort in adjusting these hyperparameters, an automatic tuning process may be used to identify the best settings for the hyperparameters though the hyperparameters may optionally be selected as an input option by a user. For example, an "AUTOTUNE" statement may be used.

For illustration, a KCLUS procedure included in SAS® Statistics 8.5 Procedures developed and provided by SAS Institute Inc. of Cary, N.C., USA may be used for a k-means clustering model type; a TREESPLIT Procedure included in SAS® Statistics 8.5 Procedures may be used for a decision tree model type; a FACTMAC procedure included in SAS® Visual Data Mining and Machine Learning 8.5 Procedures developed and provided by SAS Institute Inc. of Cary, N.C., USA may be used for a factorization machine model type; a FOREST procedure included in SAS® Visual Data Mining and Machine Learning 8.5 Procedures may be used for a random forest model type; a GRADBOOST procedure included in SAS® Visual Data Mining and Machine Learning 8.5 Procedures may be used for a gradient boosting model type; a NNET procedure included IN SAS® Visual Data Mining and Machine Learning 8.5 Procedures may be used for a gradient boosting model type; a SVMACHINE procedure included in SAS® Visual Data Mining and Machine Learning 8.5 Procedures may be used for a support vector model type; etc. SAS® Statistics 8.5 Procedures and SAS® Visual Data Mining and Machine Learning 8.5 Procedures were published by SAS Institute Inc. as part of SAS® documentation In an operation 202, a second indicator may be received that indicates one or more task parameters to evaluate where the task parameters are a subset of the hyperparameters of the machine learning model type indicated in operation 200 for which the user wants to evaluate an impact of various values on a task execution time. As an example, the second indicator may be received by thread determination application 122 after selection from a user interface window or after entry by a user into a user interface window. The subset may include some or all of the hyperparameters of the model type indicated by the computing task. Using the second indicator, the user may select one or more of the hyperparameters to evaluate using a lower bound value, an upper bound value, and an iteration value for each task parameter or by providing a list of values to evaluate for each task parameter. In general, the task parameters are the hyperparameters expected to most affect the selection of a number of threads. For example, when the gradient boosting model type is indicated in operation 200, the task parameters may include a number of trees and a tree depth. Different hyperparameters of the gradient boosting model type may be indicated as desired by the user. Table 1 below provides illustrative task parameters to evaluate for several types of machine learning models though additional or fewer task parameters may be used.

| Machine learning model type | Task parameters to evaluate |
|---|---|
| Gradient Boosting Tree | number of trees, tree depth, learning rate, number of bins, leaf size |
| Random Forest | number of trees, tree depth, number of bins, leaf size |
| Support Vector Machine | degree of polynomial kernel, penalty parameter |

-continued

| Machine learning model type | Task parameters to evaluate |
|---|---|
| Logistics Regression | Model selection method, regularization parameter for LASSO, maximum number of steps for LASSO |
| Factorization Machine | number of factors, maximum iteration, learning rate |

In an operation 204, a third indicator may be received that indicates one or more dataset parameters to evaluate in defining observation vectors used to perform the computing task indicated in operation 200 and a list of one or more datasets. As an example, the third indicator may be received by thread determination application 122 after selection from a user interface window or after entry by a user into a user interface window. For example, the one or more dataset parameters may indicate use of a number of variables, a target variable type, a number of nominal variables of the number of variables, a number of observations, etc.

The list of one or more datasets may include a location and a name of each dataset. Each dataset may include, for example, a plurality of rows and a plurality of columns. The plurality of rows may be referred to as observation vectors or records (observations), and the columns may be referred to as variables. In an alternative embodiment, each dataset may be transposed. The plurality of variables defines a vector $x_i$ for each observation vector i=1, 2, ..., N, where N is a number of the observation vectors included in each dataset. Each observation vector may be defined using values defined for one or more variables.

Each dataset may or may not include a target variable value $y_i$ for each observation vector that may indicate a label or class or other characteristic defined for a respective observation vector $x_i$ for i=1, 2, ..., N. For example, the label or classification may indicate a class for the observation vector or otherwise indicate an identification of a characteristic of the observation vector. For example, a $y_i$ value may indicate the label determined for the observation vector $x_i$ such as what the observation vector $x_i$ in the form of text means, what the observation vector $x_i$ in the form of sensor signal data does or does not represent (i.e., voice, speech, an equipment failure, an intrusion, a terrain feature, etc.), etc.

Each dataset may include additional variables that are not included in the plurality of variables. One or more variables of the plurality of variables may describe a characteristic of a physical object. For example, if each dataset include data related to operation of a vehicle, the variables may include a type of vehicle, an oil pressure, a speed, a gear indicator, a gas tank level, a tire pressure for each tire, an engine temperature, a radiator level, etc.

In data science, engineering, and statistical applications, data often consists of multiple measurements (across sensors, characteristics, responses, etc.) collected across multiple time instances (patients, test subjects, etc.). These measurements may be collected in each dataset for analysis and processing or streamed to thread determination device 100 as it is generated. Each dataset may include data captured as a function of time for one or more physical objects. The data stored in each dataset may be captured at different time points, periodically, intermittently, when an event occurs, etc. Each dataset may include data captured at a high data rate such as 200 or more observation vectors per second for one or more physical objects. One or more columns of each dataset may include a time and/or date value. Each dataset may include data captured under normal and abnormal operating conditions of the physical object.

The data stored in each dataset may be received directly or indirectly from the source and may or may not be pre-processed in some manner. For example, the data may be pre-processed using an event stream processor such as the SAS® Event Stream Processing Engine (ESPE), developed and provided by SAS Institute Inc. of Cary, N.C., USA. For example, data stored in each dataset may be generated as part of the Internet of Things (IoT), where things (e.g., machines, devices, phones, sensors) can be connected to networks and the data from these things collected and processed within the things and/or external to the things before being stored in each dataset. For example, the IoT can include sensors in many different devices and types of devices, and high value analytics can be applied to identify hidden relationships and drive increased efficiencies. Some of these devices may be referred to as edge devices, and may involve edge computing circuitry. These devices may provide a variety of stored or generated data, such as network data or data specific to the network devices themselves. Again, some data may be processed with an ESPE, which may reside in the cloud or in an edge device before being stored in each dataset.

The data stored in each dataset may include any type of content represented in any computer-readable format such as binary, alphanumeric, numeric, string, markup language, etc. The content may include textual information, numeric information, etc. that further may be encoded using various encoding techniques as understood by a person of skill in the art.

Each dataset may be stored on computer-readable medium 108 or on a computer-readable media of distributed computing system 130 and accessed by thread determination device 100 using communication interface 106 and/or input interface 102. Each dataset may be stored in various compressed formats such as a coordinate format, a compressed sparse column format, a compressed sparse row format, etc. The data may be organized using delimited fields, such as comma or space separated fields, fixed width fields, using a SAS® dataset, etc. The SAS dataset may be a SAS® file stored in a SAS® library that a SAS® software tool creates and processes. The SAS dataset contains data values that are organized as a table of observation vectors (rows) and variables (columns) that can be processed by one or more SAS software tools.

Each dataset may be stored using various data structures as known to those skilled in the art including one or more files of a file system, a relational database, one or more tables of a system of tables, a structured query language database, etc. on thread determination device 100 or on distributed computing system 130.

Thread determination device 100 may coordinate access to each dataset stored on distributed computing system 130 that may include one or more computing devices. The SAS® LASR™ Analytic Server may be used as an analytic platform to enable multiple users to concurrently access data stored in each dataset. The SAS Viya open, cloud-ready, in-memory architecture also may be used as an analytic platform to enable multiple users to concurrently access data stored in each dataset.

Some systems may be of other types and configurations.

A target variable indicator, an attribute variable indicator to define each observation vector, and/or a number of observations to be selected from a respective dataset may be indicated in association with each dataset. For illustration, the target variable indicator may indicate a column number or a column name of the respective dataset that includes values for the target variable. The attribute variable indicator may indicate one or more variables. The attribute variable indicator may indicate one or more columns or one or more column names of the respective dataset that include values for each attribute variable. A data type such as nominal, interval, categorical, etc. may further be defined for the target variable and for each attribute variable. The one or more attribute variables are the variables that define each observation vector $x_i$ that has a target variable value $y_i$, where $x_i = x_{i,j}$, $j=1, \ldots, N_v$, $x_{i,j}$ is a $j^{th}$ variable value for the $i^{th}$ observation vector $x_i$, where $N_v$ indicates a number of the attribute variables. $X = x_{i,j}$, $i=1, \ldots, N_{obs}$, $j=1, \ldots, N_v$ may refer to a dataset, where $N_{obs}$ indicates a number of observations to be selected from the dataset.

The number of observations to be selected from the dataset may not be indicated in association with one or more of the datasets. For example, when the number of observations to be selected from the dataset is not indicated, all of the observations may be used, and $N_{obs} = N$ indicates a number of observations included in the respective dataset.

The target variable indicator may not be indicated in association with one or more of the datasets. For example, no target variable may be used to perform the computing task, or a first or a last column may be used by default.

The attribute variable indicator may not be indicated in association with one or more of the datasets. For example, all of the columns included in the dataset may be used to define each observation vector, or all of the columns except a column used to provide values for the target variable may be used to define each observation vector.

In an operation 206, a fourth indicator may be received that indicates one or more hardware parameters to evaluate and a list of one or more computing devices in a computing environment. For example, the one or more hardware parameters may include a number of cores, a RAM size, a cache size, a CPU speed, etc. associated with the hardware configuration of each of the one or more computing devices in the computing environment. As an example, the fourth indicator may be received by thread determination application 122 after selection from a user interface window or after entry by a user into a user interface window. The indicated one or more hardware parameters may associated with the hardware configuration of each of the one or more computing devices in the computing environment may be determined by querying the running environment.

In an operation 208, a fifth indicator may be received that indicates a plurality of numbers of threads to use in the computing environment to execute the computing task indicated in operation 200. As an example, the fifth indicator may be received by thread determination application 122 after selection from a user interface window or after entry by a user into a user interface window. For example, the plurality of numbers of threads may include a list of a number of threads values to use. For illustration, the plurality of numbers of threads to use may be 1, 2, 4, 8, 16, 32, 64, 72, 128, 144, 192, 256 though other values may be used. Each number of threads value indicates a number of threads used at each computing device included in the computing environment defined in operation 206.

In an operation 210, a sixth indicator of an order of a curve fit polynomial equation $n_o$ may be received. In an alternative embodiment, the sixth indicator may not be received. For example, a default value may be stored, for example, in computer-readable medium 108 and used automatically. In another alternative embodiment, the value of the order of a curve fit polynomial equation $n_o$ may not be selectable. Instead, a fixed, predefined value may be used. For illustration, a default value for the order of a curve fit polynomial equation $n_o$ may be $n_0=3$ though other values greater than or equal to two may be used.

In an operation 212, a seventh indicator may be received that indicates a thread determination model to train. For example, the seventh indicator indicates a name of a machine learning model to train as well as the training parameter and hyperparameter values to use to train the machine learning model. For illustration, the thread determination model predicts an optimal value for a number of threads based on the one or more task parameters, the one or more dataset parameters, and the one or more hardware parameters. As an example, the seventh indicator may be received by thread determination application 122 after selection from a user interface window or after entry by a user into a user interface window. A machine learning model type may be selected from "K-Clustering", "Decision Tree", "Factorization Machine", "Forest", "Gradient Boosting", "Neural Network", "Support Vector Machine", etc. The model type may be labeled or selected in a variety of different manners by the user as understood by a person of skill in the art.

In an alternative embodiment, the seventh indicator may not be received. For example, a default model may be used automatically. In another alternative embodiment, the thread determination model to train may not be selectable. Instead, a fixed, predefined model may be used. For illustration, a default model for the thread determination model to train may be a decision tree.

The seventh indicator may further indicate one or more hyperparameters to use for training and validating the indicated model type and/or values for an automatic tuning method (autotune option) as well as other training options such as an objective function, training stop criteria, etc. Hyperparameters define values or various options that govern a training process based on the model type.

In an operation 214, a set of task configurations is generated using unique combinations of values associated with the one or more task parameters and the number of threads values to evaluate for each dataset indicated in operation 204 using each computing device indicated in operation 206. The set of task configurations may be stored in task configuration data 124. For illustration, Table 2 below provides a set of task configurations defined for training a gradient boosting tree model, where a tree depth and a number of trees are the one or more task parameters, ten different datasets are listed for the one or more datasets, and the number of cores is the hardware parameter associated with each of two different computing devices. The number of threads values to evaluate for each unique combination of the one or more task parameters, the one or more datasets, and the one or more computing devices is 1, 2, 4, 8, 16, 32, 64, 72, 128, 144, 192, 256. The tree depth values listed in operation 202 were 3 and 7. The number of trees values listed in operation 202 were either 25, 50, 75, and 100 for large datasets or 100, 500, 1000, and 2000 otherwise. Two different computing device names were listed in operation 206 with the number of cores $N_c$ values of 16 and 72 cores, respectively, indicated as the hardware parameter. Based on this, the number of unique configurations is 2×4×10×2×12=1920 unique task configurations.

TABLE 2

| Configuration # | Tree depth | # of trees | Dataset | Computing device | # of threads |
|---|---|---|---|---|---|
| 1 | 3 | 100 | 1 | 1-16 cores | 1 |
| 2 | 3 | 100 | 1 | 1-16 cores | 2 |
| ... | ... | ... | ... | ... | ... |
| 13 | 3 | 100 | 1 | 2-72 cores | 1 |
| ... | ... | ... | ... | ... | ... |
| 25 | 3 | 500 | 1 | 1-16 cores | 1 |
| ... | ... | ... | ... | ... | ... |
| 1920 | 7 | 2000 | 10 | 2-72 cores | 256 |

In an operation 216, execution of the computing task is controlled based on each task configuration included in the set of task configurations. For example, the gradient boosting tree model is trained with hyperparameter values for the tree depth and the number of trees as defined in each respective task configuration. The gradient boosting tree model is further trained with other hyperparameter values and other training parameters as defined by the computing task indicated in operation 200. The gradient boosting tree model is further trained using the dataset and the computing device as indicated in each respective task configuration. Each indicated computing device uses the number of threads allocated as defined in each respective task configuration. For example, the GRADBOOST procedure or another SAS action may be called to execute the computing task to train the gradient boosting tree model.

For illustration, based on the set of task configurations indicated in Table 2, the gradient boosting tree model is trained 1920 times. The execution time for executing the computing task is recorded for each task configuration. In an illustrative embodiment, each computing task may be executed multiple times with each task configuration using a different random seed to compute an average execution time for each task configuration. For example, each computing task may be executed five times with each task configuration.

A performance result table may be created from the set of task configurations, for example, as shown in Table 3 below that further captures an execution speedup that is an execution time using a respective number of threads divided by the execution time using a single thread. Values of the execution speedup less than one indicate a slower execution, whereas values greater than one indicate a faster execution.

TABLE 3

| Config. # | Tree depth | # of trees | Dataset | Computing device | # of threads | Exec. time | Exec. speedup |
|---|---|---|---|---|---|---|---|
| 1 | 3 | 100 | 1 | 1-16 cores | 1 | 0.284 | 1.0 |
| 2 | 3 | 100 | 1 | 1-16 cores | 2 | 0.165 | 1.717 |
| ... | ... | ... | ... | ... | ... | ... | ... |
| 13 | 3 | 100 | 1 | 2-72 cores | 1 | 0.184 | 1.0 |
| ... | ... | ... | ... | ... | ... | ... | ... |
| 25 | 3 | 500 | 1 | 1-16 cores | 1 | 0.428 | 1.0 |
| ... | ... | ... | ... | ... | ... | ... | ... |
| 1920 | 7 | 2000 | 10 | 2-72 cores | 256 | 93.898 | 0.584 |

In an operation 218, a polynomial equation having the order indicated in operation 210 is fit to each subset of task configurations having common values for each of the one or more task parameters, the one or more datasets, and the one or more computing devices, but different values for the number of threads value. For example, referring to Table 2, task configurations 1 through 12 have common values for each of the one or more task parameters, the one or more datasets, and the one or more computing devices, but different values for the number of threads value. Each polynomial equation is fit to the execution speedup as a function of the number of threads value for the subset having the common values. Alternatively, each polynomial equation may be fit to the execution time as a function of the number of threads value for the subset having the common values.

Figure 7:
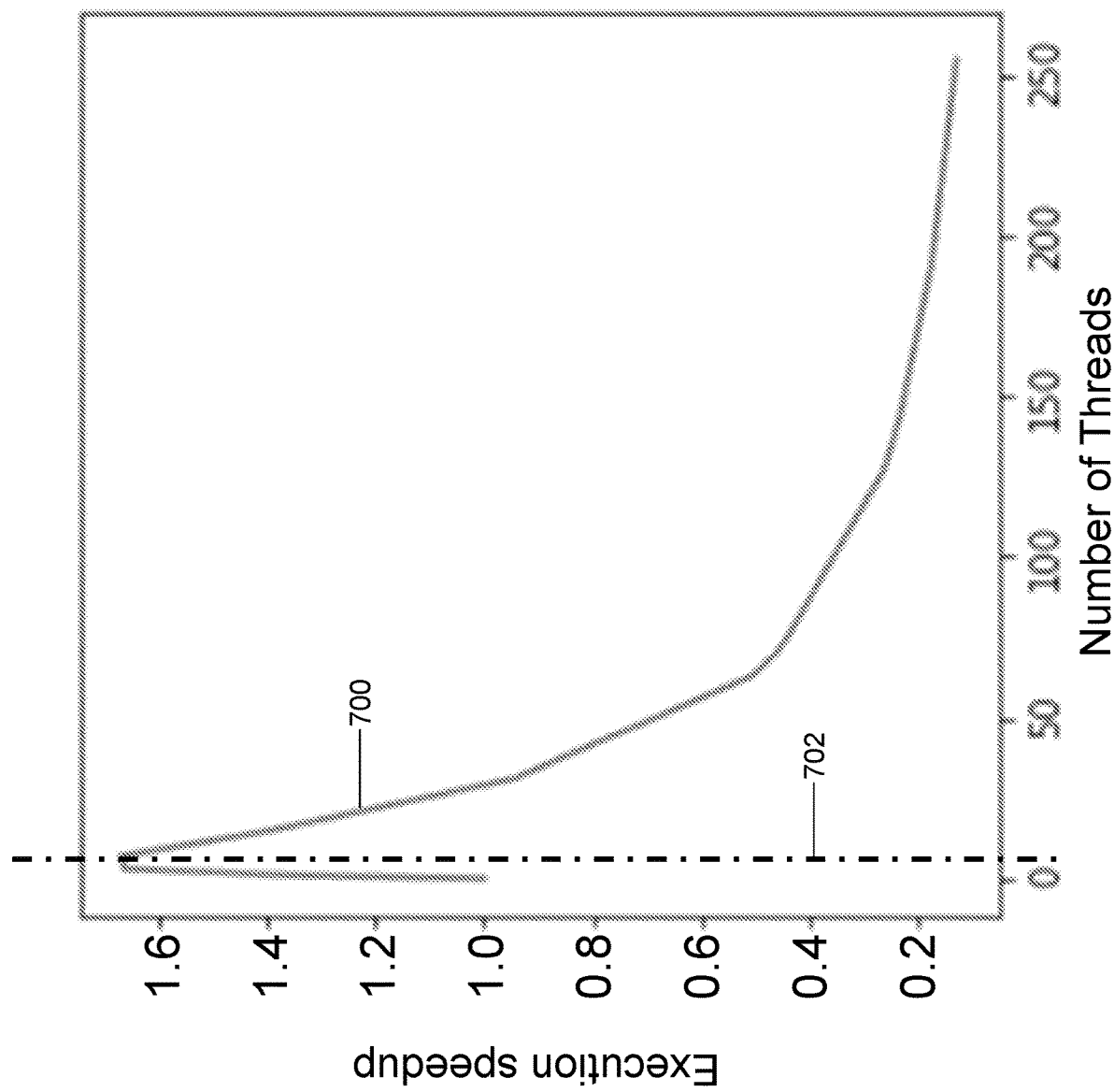
FIG. 7 shows a curve of an execution speedup as a function of the number of threads for a set of task configurations in accordance with an illustrative embodiment.

For illustration, referring to FIG. 7, a curve 700 is defined for task configurations using the first dataset with 72 cores, a tree depth value of 7, and a number of trees value of 2000. As understood by a person of skill in the art, the polynomial equation is fit to the data described by curve 700. For example, for $n_0=3$, the polynomial equation is defined as $y=a+bx+cx^2+dx^3$, where x indicates the number of threads values, and y indicates the execution speedup values or the execution time values. The coefficients a, b, c, and d are defined by fitting the polynomial equation to the paired x, y values defined for each respective subset of task configurations to define a polynomial equation for each subset. In an alternative embodiment, the x values and/or the y values may be scaled. For example, log base 2 values may be computed from each x value and y value.

In an operation 220, an optimal number of threads value may be determined for each subset of task configurations, for example, by computing the number of threads value associated with a first maxima of the polynomial equation defined for each subset of task configurations when y indicates the execution speedup values. When y indicates the execution time values, a first minima of the polynomial equation may be computed.

In an operation 222, the common values and the determined optimal number of threads may be stored to performance dataset 126 for each subset of task configurations. In an illustrative embodiment, instead of storing the dataset name, the number of attribute variables $N_v$, the target variable type, a number of nominal variables, and/or the number of observation vectors $N_{obs}$ may be stored based on the one or more dataset parameters indicated in operation 204 because these parameters define characteristics that can be used to evaluate other datasets. Similarly, in an illustrative embodiment, instead of storing the computer name, the number of cores $N_c$, the RAM size, the cache size, the CPU speed, etc. may be stored based on the one or more hardware parameters indicated in operation 206 because these parameters define characteristics that can be used to evaluate use of other computing devices to perform the computing task. In the illustrative embodiment, the hardware parameter indicated was the number of cores $N_c$. An illustrative performance dataset 126 is shown in Table 4 below. In the illustration of Table 2, the number of subset configurations is 2×4×10×2=160.

TABLE 4

| Subset Config. # | Tree depth | # of trees | $N_v$ | Target variable type | # nominal variables | $N_{obs}$ | $N_c$ | Optimal # of threads |
|---|---|---|---|---|---|---|---|---|
| 1 | 3 | 100 | 14 | nominal | 8 | 19537 | 16 | 6 |
| 2 | 3 | 500 | 14 | nominal | 8 | 19537 | 16 | 7 |
| 3 | 3 | 1000 | 14 | nominal | 8 | 19537 | 16 | 7 |
| 4 | 3 | 2000 | 14 | nominal | 8 | 19537 | 16 | 7 |
| ... | ... | ... | ... | ... | ... | ... | ... | ... |
| 158 | 7 | 50 | 174 | interval | 110 | 3040134 | 72 | 66 |
| 159 | 7 | 75 | 174 | interval | 110 | 3040134 | 72 | 67 |
| 160 | 7 | 100 | 174 | interval | 110 | 3040134 | 72 | 68 |

In an operation 224, the thread determination model indicated in operation 212 is trained with performance dataset 126 as the input dataset. The thread determination model is trained to predict the optimal number of threads to use given the task parameters, the dataset parameters, and the hardware parameters.

In an operation 226, the trained thread determination model may be stored, for example, in thread determination description 128. For illustration, the trained thread determination model may be stored using the ASTORE procedure described in SAS® Visual Data Mining and Machine Learning 8.5 Procedures. For further illustration, when the thread determination model type is a decision tree, the trained thread determination model may be stored as a series of rules that are applied to determine the optimal number of threads. The series of rules may be included in a function with inputs based on values for the task parameters, the dataset parameters, and the hardware parameters. The output of the function is the optimal number of threads. For example, the function may be written in the C programming language though other languages may be used.

Figure 8:
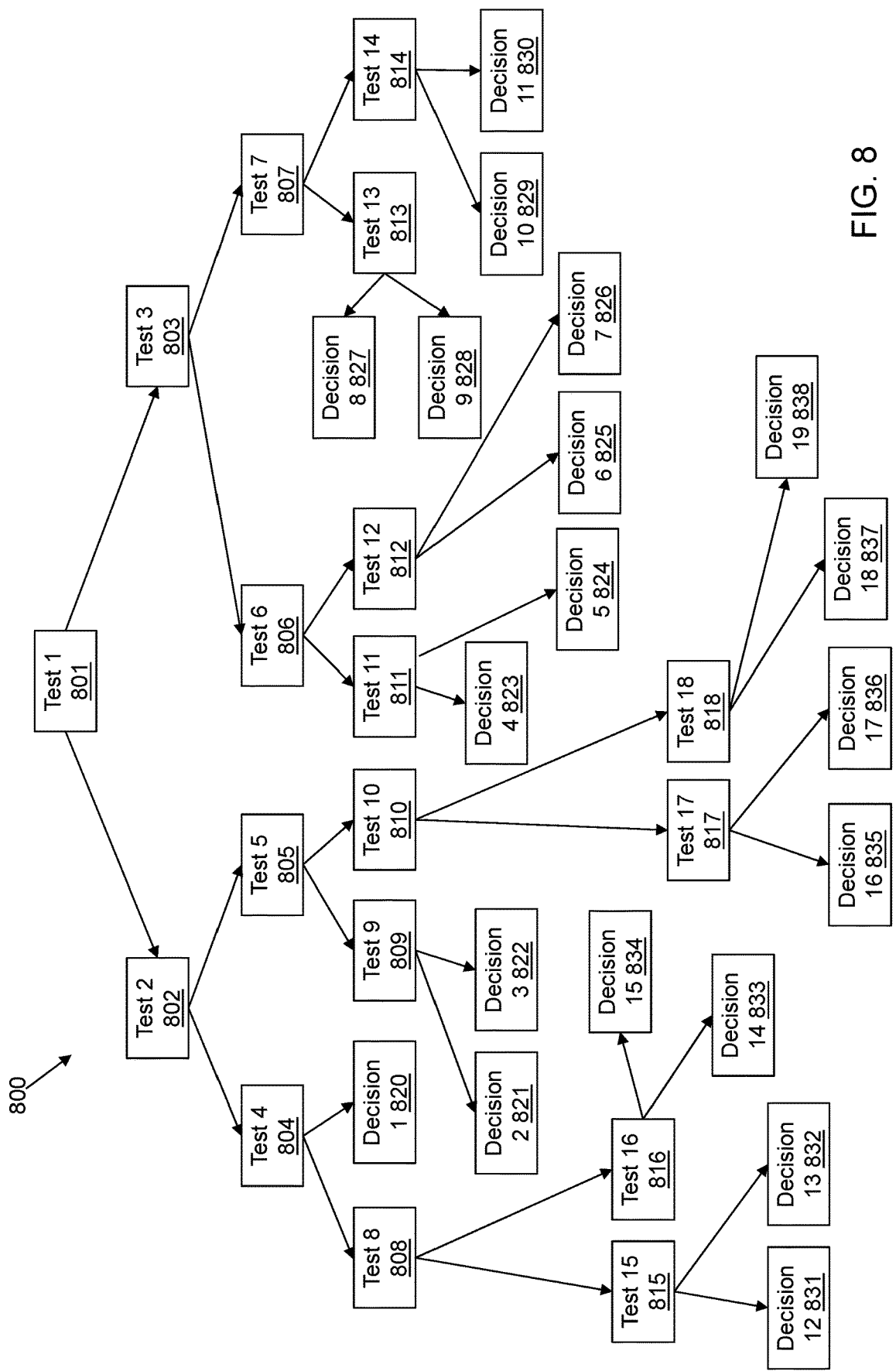
FIG. 8 shows a thread determination model in accordance with an illustrative embodiment.

For example, referring to FIG. 8, a decision tree 800 that is the trained thread determination model is shown in accordance with an illustrative embodiment. Decision tree 800 may include a test 1 801 that splits the tree into a test 2 802 and a test 3 803. Test 2 802 splits the tree into a test 4 804 and a test 5 805. Test 3 803 splits the tree into a test 6 806 and a test 7 807. Test 4 804 splits the tree into a test 8 808 and a decision 1 820 that is a leaf of decision tree 800. Test 5 805 splits the tree into a test 9 809 and a test 10 810. Test 6 806 splits the tree into a test 11 811 and a test 12 812. Test 7 807 splits the tree into a test 13 813 and a test 14 814. Test 8 808 splits the tree into a test 15 815 and a test 16 816. Test 9 809 splits the tree into a decision 2 821 and a decision 3 822 that are leaves of decision tree 800. Test 10 810 splits the tree into a test 17 817 and a test 18 818. Test 11 811 splits the tree into a decision 4 823 and a decision 5 824 that are leaves of decision tree 800. Test 12 812 splits the tree into a decision 6 825 and a decision 7 826 that are leaves of decision tree 800. Test 13 813 splits the tree into a decision 8 827 and a decision 9 828 that are leaves of decision tree 800. Test 14 814 splits the tree into a decision 10 829 and a decision 11 830 that are leaves of decision tree 800. Test 15 815 splits the tree into a decision 12 831 and a decision 13 832 that are leaves of decision tree 800. Test 16 816 splits the tree into a decision 14 833 and a decision 15 834 that are leaves of decision tree 800. Test 17 817 splits the tree into a decision 16 835 and a decision 17 836 that are leaves of decision tree 800. Test 18 818 splits the tree into a decision 18 838 and a decision 19 838 that are leaves of decision tree 800.

The leaves of decision tree 800 define the optimal number of threads based on the tests in the path that reaches each respective leaf. The series of tests to arrive at each leaf define the rule applied. Based on decision tree 800, there are 19 rules that are successively applied until a leaf is reached that identifies the optimal number of threads. For example, to reach decision 11 830 that defines a number of threads, test 1 801, test 3 803, test 7 807, and test 14 814 are applied. Because each test results in a binary yes/no or true/false result, for illustration, a left result from each test may be reached when the test yields a true result, and a right result from each test may be reached when the test yields a false result. Based on this, decision 11 830 may be reached when test 1 801, test 3 803, test 7 807, and test 14 814 are all false. The rule to reach the number of threads defined by decision 11 830 may be defined as test 1 801 is false and test 3 803 is false and test 7 807 is false and test 14 814 is false.

For simplicity, each rule may convert each test to true. In some cases, one or more of the tests may be based on the same parameter and can be combined into a single test. For example, if test 1 801 is $N_{obs} \leq 656689$, test 3 803 is $N_v \leq 103.5$, test 7 807 is $N_c \leq 44$, test 14 814 is $N_{obs} \leq 2026756$, and decision 11 830 indicates 67 threads, the rule may be defined as if $((N_{obs} > 2026756) \& (N_v > 104) \& (N_c > 44))$, then $N_T = 67$, where $N_T$ indicates the number of threads to use.

Figure 3:
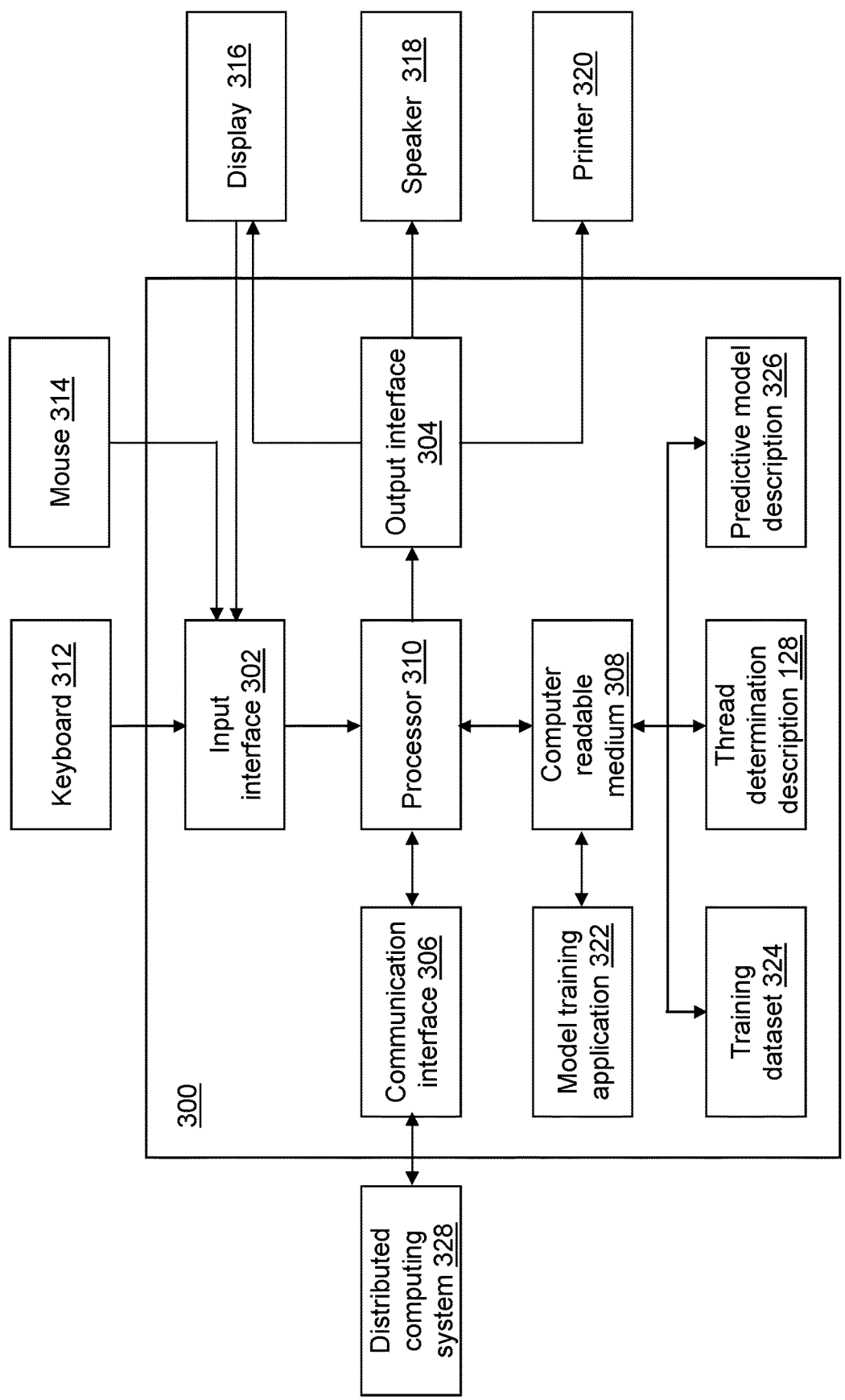
FIG. 3 depicts a block diagram of a model training device in accordance with an illustrative embodiment.

Referring to FIG. 3, a block diagram of a model training device 300 is shown in accordance with an illustrative embodiment. Model training device 300 may include a second input interface 302, a second output interface 304, a second communication interface 306, a second non-transitory computer-readable medium 308, a second processor 310, a model training application 322, training dataset 324, thread determination description 128, and a predictive model description 326. Fewer, different, and/or additional components may be incorporated into model training device 300. Model training device 300 and thread determination device 100 may be the same or different devices.

Second input interface 302 provides the same or similar functionality as that described with reference to input interface 102 of thread determination device 100 though referring to model training device 300. Second output interface 304 provides the same or similar functionality as that described with reference to output interface 104 of thread determination device 100 though referring to model training device 300. Second communication interface 306 provides the same or similar functionality as that described with reference to communication interface 106 of thread determination device 100 though referring to model training device 300. Data and messages may be transferred between model training device 300 and a distributed computing system 328 using second communication interface 306. Distributed computing system 130 and distributed computing system 328 may be the same or different computing systems. Second computer-readable medium 308 provides the same or similar functionality as that described with reference to computer-readable medium 108 of thread determination device 100 though referring to model training device 300. Second processor 310 provides the same or similar functionality as that described with reference to processor 110 of thread determination device 100 though referring to model training device 300.

Model training application 322 performs operations associated with training a predictive model using training dataset 324 with a number of threads determined by a user or using thread determination description 128. Some or all of the operations described herein may be embodied in model training application 322. The operations may be implemented using hardware, firmware, software, or any combination of these methods.

Referring to the example embodiment of FIG. 3, model training application 322 is implemented in software (comprised of computer-readable and/or computer-executable instructions) stored in second computer-readable medium 308 and accessible by second processor 310 for execution of the instructions that embody the operations of model training application 322. Model training application 322 may be written using one or more programming languages, assembly languages, scripting languages, etc. Similar to thread determination application 122, model training application 322 may be integrated with other analytic tools such as data analytics software offered by SAS Institute Inc. Model training application 322 may be implemented as a Web application.

Figure 4:
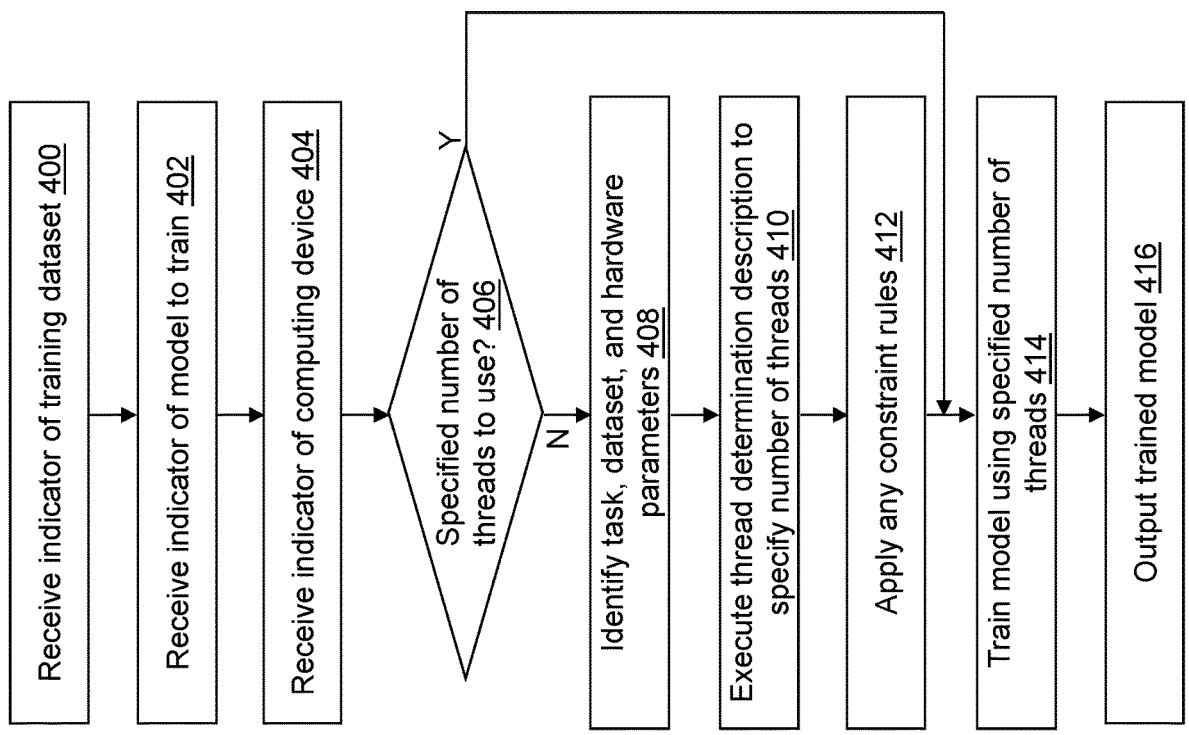
FIG. 4 depicts a flow diagram illustrating examples of operations performed by a model training application of the model training device of FIG. 3 in accordance with an illustrative embodiment.

Referring to FIG. 4, example operations of model training application 322 are described to generate new tabular data. Additional, fewer, or different operations may be performed depending on the embodiment of model training application 322. The order of presentation of the operations of FIG. 4 is not intended to be limiting. Although some of the operational flows are presented in sequence, the various operations may be performed in various repetitions, concurrently (in parallel, for example, using threads and/or distributed computing system 328), and/or in other orders than those that are illustrated.

In an operation 400, an eighth indicator may be received that indicates training dataset 324. For example, the eighth indicator indicates a location and a name of training dataset 324. As an example, eighth eleventh indicator may be received by model training application 322 after selection from a user interface window or after entry by a user into a user interface window. In an alternative embodiment, training dataset 324 may not be selectable. For example, a most recently created dataset may be used automatically.

As described previously relative to operation 204, training dataset 324 may include, for example, a plurality of rows and a plurality of columns. Training dataset 324 may or may not include a target variable value $y_i$ for each observation vector. Training dataset 324 may include additional variables that are not included in the plurality of variables. The data stored in training dataset 324 may be received directly or indirectly from the source and may or may not be pre-processed in some manner.

As described previously relative to operation 204, training dataset 324 may be stored using various data structures on second computer-readable medium 308 or on a computer-readable media of distributed computing system 328 and accessed by model training device 300 using second communication interface 306 and/or second input interface 302.

A target variable indicator, an attribute variable indicator to define each observation vector, and/or a number of observations to be selected from a respective dataset may be indicated in association with training dataset 324. The number of observations may not be indicated when all of the observations are used. The target variable indicator may not be indicated when no target variable is used to train the model, or a first or a last column may be used by default. The attribute variable indicator may not be indicated in association with one or more of the datasets. For example, all of the columns included in training dataset 324 may be used to define each observation vector, or all of the columns except a column used to provide values for the target variable may be used to define each observation vector.

In operation 402, a ninth indicator indicates a model type to train. For example, the ninth indicator indicates a name of a model type that performs prediction and/or classification. The ninth indicator may be received by model training application 322 from a user interface window or after entry by a user into a user interface window. A default value for the model type may further be stored, for example, in second computer-readable medium 308. As an example, a model type may be selected from "SVM", "K-Cluster", "Neural Network", "Logistic Regression", "Forest", "Gradient Boosting", "Decision Tree", "Factorization Machine", etc. Of course, the model type may be labeled or selected in a variety of different manners by the user as understood by a person of skill in the art. In an alternative embodiment, the model type may not be selectable, and a single model type is implemented by model training application 322. For example, the model type indicated as "Forest" may be used by default or without allowing a selection. One or more hyperparameters to use for training and validating the indicated model type and/or specified values for the automatic tuning method may also be indicated using the ninth indicator.

In operation 404, a tenth indicator indicates a computing device used to train the model. For example, the tenth indicator indicates a computer name of a computing device used to train the model. Training dataset 324 may be loaded onto a computing device of distributed computing system 328 or stored in second computer-readable medium 308 of model training device 300. Alternatively, the tenth indicator may not be received indicating use of model training device 300. The tenth indicator may be received by model training application 322 from a user interface window or after entry by a user into a user interface window.

In an operation 406, a determination is made concerning whether the user specified a number of threads to use to train the model. When the user specified a number of threads to use, processing continues in an operation 414. When the user did not specify a number of threads to use, processing continues in an operation 408. For example, the user may specify an option as part of the ninth indicator or the tenth indicator that indicates a user selected number of threads to use.

In operation 408, the task parameters indicated in operation 202, the dataset parameters indicated in operation 204, and the hardware parameters indicated in operation 206 associated with training the thread determination model are identified. For example, a value of the hyperparameters indicated in operation 202 are identified as the task parameters based on parameters indicated in operation 402. Values for the dataset parameters indicated in operation 204 are determined from the training dataset indicated in operation 400. For example, a number of observations included in training dataset 324, a number of variables used to train the model from training dataset 324, a target variable type of the target variable used to train the model from training dataset 324, a number of variables used to train the model having the nominal variable type, etc. may be determined and identified as the values of the dataset parameters. For example, a number of cores may be determined and identified as the hardware parameter value based on the computing device indicated in operation 404.

In an operation 410, an executable function defined using a content of thread determination description 128 is executed to specify the number of threads to use. Model training application 322 and thread determination description 128 may be integrated in various manners to determine the number of threads to use. For example, the content of thread determination description 128 may be a C function or a C executable that includes the series of rules stored in operation 226 to determine the optimal number of threads. As another option, the content of thread determination description 128 may be a model executable stored using the ASTORE procedure that can be used to execute the trained thread determination model. The function is provided the values of the task, dataset, and hardware parameters identified in operation 408 as input values. The function returns the number of threads to use.

In an operation 412, thread constraint rules, if any, are applied to limit the specified number of threads. For example, the user may specify constraints on the specified number of threads and/or model training application 322 may have predefined constraints on the specified number of threads. For example, the number of threads specified in operation 410 may be limited to a number of licenses, may not exceed a number of cores, etc.

In operation 414, a model is trained with the specified number of threads, possibly limited by thread constraint rules, using the computing environment indicated in operation 404 and the observation vectors read from training dataset 324 based on the model type and the hyperparameters indicated in operation 402. For example, the model may be trained and validated using another application that is distinct from model training application 322 or is integrated with model training application 322. Training dataset 324 may be accessed from second computer-readable medium 308 or the computing device of distributed computing system 328 based on the indicated computing environment.

In an operation 416, the data that describes the trained model is output, for example by storing the characteristics of the trained model in predictive model description 326. For illustration, the trained model may be stored using the ASTORE procedure.

Figure 5:
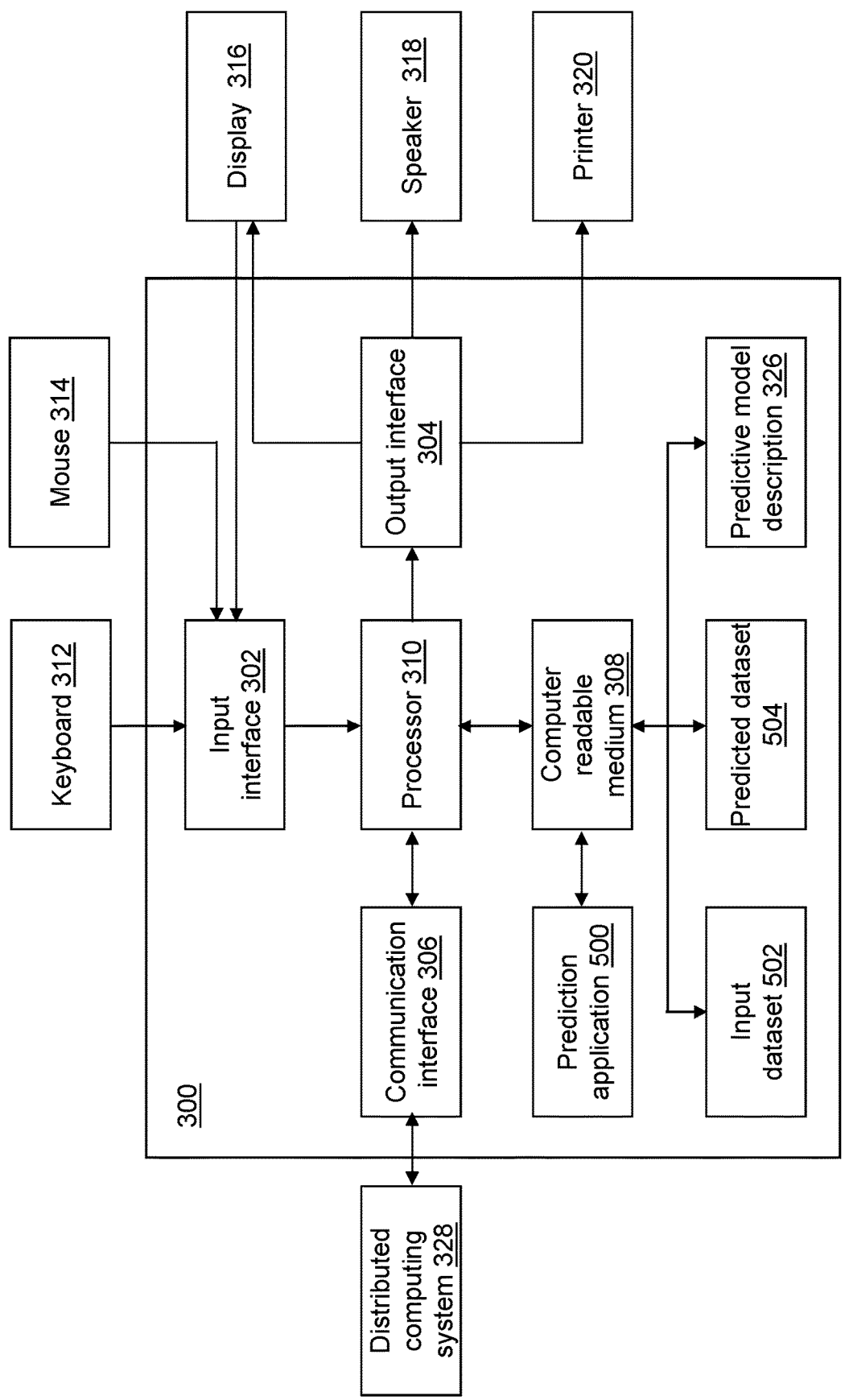
FIG. 5 depicts a block diagram of a prediction device in accordance with an illustrative embodiment.

Referring to FIG. 5, model training device 300 may further include a prediction application 500, input dataset 502, and predicted dataset 504.

Training dataset 324 and input dataset 502 may be generated, stored, and accessed using the same or different mechanisms. Similar to training dataset 324, input dataset 502 may include a plurality of rows and a plurality of columns with the plurality of rows referred to as observations or records, and the columns referred to as variables that are associated with an observation. Input dataset 502 may be transposed.

Similar to training dataset 324, input dataset 502 may be stored on second computer-readable medium 308 or on one or more computer-readable media of distributed computing system 328 and accessed by model training device 300 using second communication interface 306. Data stored in input dataset 502 may be a sensor measurement or a data communication value, for example, from a sensor, may be generated or captured in response to occurrence of an event or a transaction, generated by a device such as in response to an interaction by a user with the device, for example, from a second keyboard 312 or a second mouse 314, etc. The data stored in input dataset 502 may include any type of content represented in any computer-readable format such as binary, alphanumeric, numeric, string, markup language, etc. The content may include textual information, numeric information, etc. that further may be encoded using various encoding techniques as understood by a person of skill in the art. The data stored in input dataset 502 may be captured at different time points, periodically, intermittently, when an event occurs, etc. One or more columns may include a time value. Similar to training dataset 324, data stored in input dataset 502 may be generated as part of the IoT, and some or all data may be pre- or post-processed by an ESPE.

Similar to training dataset 324, input dataset 502 may be stored in various compressed formats such as a coordinate format, a compressed sparse column format, a compressed sparse row format, etc. Input dataset 502 further may be stored using various structures as known to those skilled in the art including a file system, a relational database, a system of tables, a structured query language database, etc. on model training device 300 and/or on distributed computing system 328. Model training device 300 may coordinate access to input dataset 502 that is distributed across a plurality of computing devices that make up distributed computing system 328. For example, input dataset 502 may be stored in a cube distributed across a grid of computers as understood by a person of skill in the art. As another example, input dataset 502 may be stored in a multi-node Hadoop® cluster. As another example, input dataset 502 may be stored in a cloud of computers and accessed using cloud computing technologies, as understood by a person of skill in the art. The SAS® LASR™ Analytic Server and/or SAS® Viya™ may be used as an analytic platform to enable multiple users to concurrently access data stored in input dataset 502.

Figure 6:
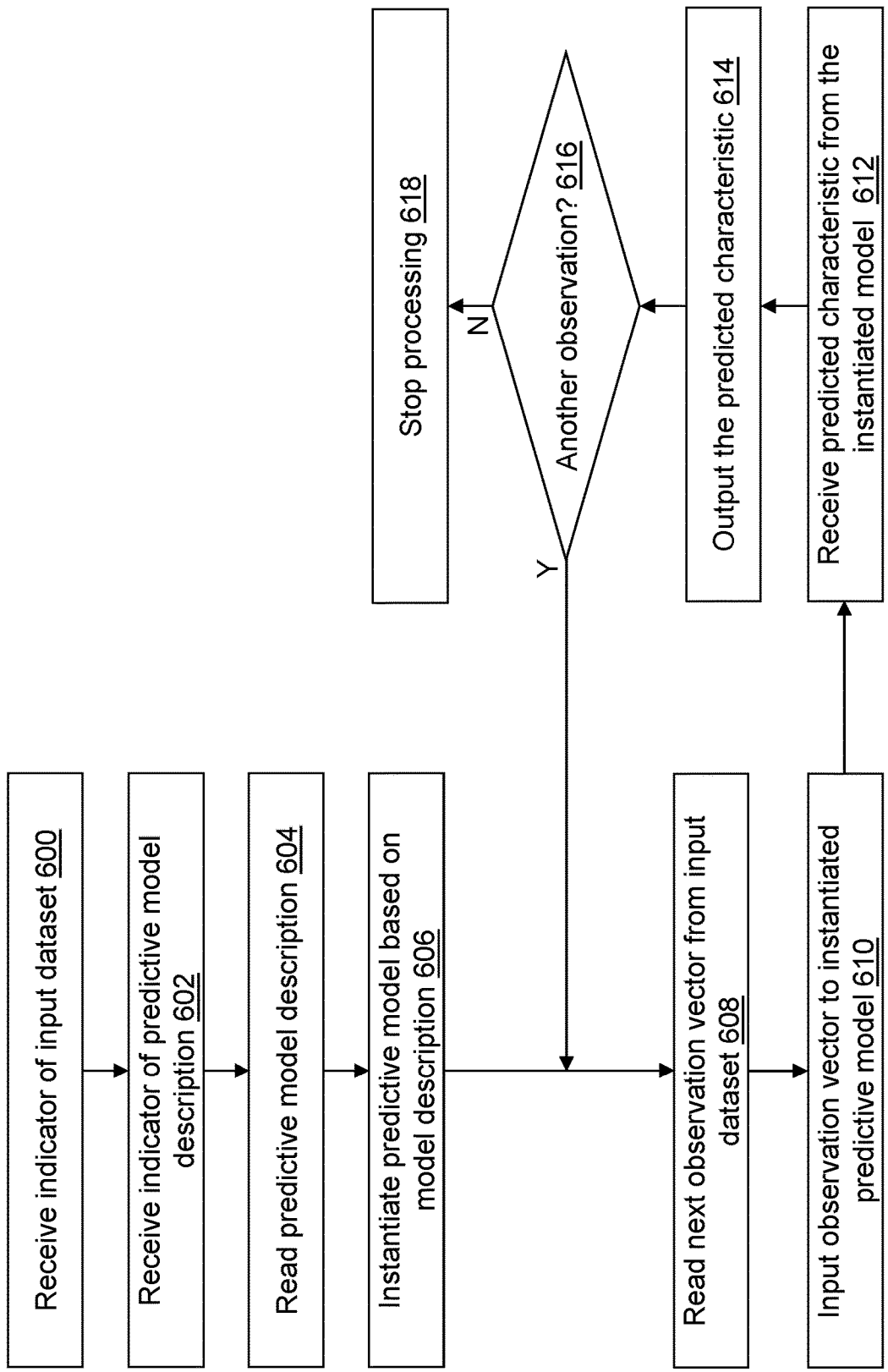
FIG. 6 depicts a flow diagram illustrating examples of operations performed by a prediction of the prediction device of FIG. 5 in accordance with an illustrative embodiment.

Referring to FIG. 6, example operations of prediction application 500 are described to use the trained machine learning model to predict a characteristic for each observation vector included in input dataset 502.

In an operation 600, an eleventh indicator may be received that indicates input dataset 502. For example, the eleventh indicator indicates a location and a name of input dataset 502. As an example, the eleventh indicator may be received by prediction application 500 after selection from a user interface window or after entry by a user into a user interface window. In an alternative embodiment, input dataset 502 may not be selectable. For example, a most recently created dataset may be used automatically.

In an operation 602, a twelfth indicator may be received that indicates predictive model description 326. For example, the twelfth indicator indicates a location and a name of predictive model description 326. As an example, the twelfth indicator may be received by prediction application 500 after selection from a user interface window or after entry by a user into a user interface window. In an alternative embodiment, predictive model description 326 may not be selectable. For example, a most recently created model configuration data may be used automatically. As another example, predictive model description 326 may be provided automatically as part of integration with model training application 322.

In an operation 604, a predictive model description may be read from predictive model description 326.

In an operation 606, a predictive model is instantiated with the predictive model description.

In an operation 608, a next observation vector is read from input dataset 502. For example, on a first iteration of operation 608, a first observation vector is read from input dataset 502; on a second iteration of operation 608, a second observation vector is read from input dataset 502; and so on.

In an operation 610, the observation vector is input to the instantiated predictive model to predict a characteristic of the observation vector.

In an operation 612, a predicted characteristic value for the read observation vector is received as an output of the instantiated model. The output may include a probability that the observation vector has one or more different possible characteristic values.

In an operation 614, the predicted characteristic value may be output, for example, by storing the predicted characteristic value with the observation vector to predicted dataset 504. In addition, or in the alternative, the predicted characteristic value may be presented on a second display 316, printed on a second printer 320, sent to another computing device using second communication interface 306, an alarm or other alert signal may be sounded through a second speaker 318, etc.

In an operation 616, a determination is made concerning whether or not input dataset 502 includes another observation vector. When input dataset 502 includes another observation vector, processing continues in operation 608. When input dataset 502 does not include another observation vector, processing continues in an operation 618.

In operation 618, processing stops.

A performance of thread determination application 122 was compared to use of a default number of threads value of 72. Five different datasets were used as summarized below in Table 5.

TABLE 5

| Dataset | $N_v$ | # nominal variables | $N_{obs}$ | Target variable type |
|---|---|---|---|---|
| adult | 14 | 8 | 19537 | nominal |
| amazon | 8 | 0 | 26215 | nominal |
| comcast | 11 | 0 | 300000 | nominal |
| fico | 23 | 0 | 6275 | nominal |
| upsell | 78 | 37 | 40000 | nominal |
| kdd2009 | 230 | 38 | 50000 | nominal |
| paypal | 166 | 151 | 965861 | nominal |

The results are summarized below in Table 6.

TABLE 6

| Dataset | $N_{T,optimal}$ | Runtime using $N_{T,optimal}$ seconds | Runtime using $N_T = 72$ seconds | Memory used using $N_{T,optimal}$ | Memory used using $N_T = 72$ |
|---|---|---|---|---|---|
| adult | 5 | 2.72 | 10.28 | 44.03 megabytes (M) | 63.49 M |
| amazon | 5 | 2.82 | 10.19 | 45.36 M | 58.16 M |
| comcast | 22 | 10.41 | 14.86 | 95.33 M | 295.01 M |
| fico | 5 | 2.3 | 10.64 | 40.96 M | 486.4 M |
| upsell | 7 | 8.57 | 15.27 | 0.38 G | 3.18 G |
| kdd2009 | 7 | 14.63 | 34.86 | 0.39 G | 3.56 G |
| paypal | 59 | 25.71 | 23.88 | 1.16 G | 1.38 G |

Compared with using the default number of threads of 72, thread determination description 128 was 2.3 times faster and used 3.5 times less memory.

The word "illustrative" is used herein to mean serving as an example, instance, or illustration. Any aspect or design described herein as "illustrative" is not necessarily to be construed as preferred or advantageous over other aspects or designs. Further, for the purposes of this disclosure and unless otherwise specified, "a" or "an" means "one or more". Still further, using "and" or "or" in the detailed description is intended to include "and/or" unless specifically indicated otherwise. The illustrative embodiments may be implemented as a method, apparatus, or article of manufacture using standard programming and/or engineering techniques to produce software, firmware, hardware, or any combination thereof to control a computer to implement the disclosed embodiments.

The foregoing description of illustrative embodiments of the disclosed subject matter has been presented for purposes of illustration and of description. It is not intended to be exhaustive or to limit the disclosed subject matter to the precise form disclosed, and modifications and variations are possible in light of the above teachings or may be acquired from practice of the disclosed subject matter. The embodiments were chosen and described in order to explain the principles of the disclosed subject matter and as practical applications of the disclosed subject matter to enable one skilled in the art to utilize the disclosed subject matter in various embodiments and with various modifications as suited to the particular use contemplated.

What is claimed is:

1. A non-transitory computer-readable medium having stored thereon computer-readable instructions that when executed by a computing device cause the computing device to:
 control execution of a computing task in a computing environment based on each task configuration included in a plurality of task configurations to determine an execution runtime value for each task configuration,
 wherein the computing task is training a machine learning model,
 wherein each task configuration of the plurality of task configurations includes a task parameter value, a dataset indicator, a hardware indicator, and a number of threads value,
 wherein the task parameter value is an input to the computing task,
 wherein the dataset indicator indicates a dataset to use when executing the computing task,
 wherein the hardware indicator indicates an executing computing device in the computing environment used to execute the computing task,
 wherein the number of threads value indicates a number of threads to use to execute the computing task using the executing computing device;
 determine an optimal number of threads value for each set of task configurations in the plurality of task configurations that have common values for the task parameter value, the dataset indicator, and the hardware indicator, wherein the optimal number of threads value is determined as an extremum value of an execution parameter value as a function of the number of threads value;
 determine a dataset parameter value for the dataset;
 determine a hardware parameter value as a characteristic of each distinct executing computing device in the computing environment indicated using the hardware indicator; and
 store, in a performance dataset, the determined optimal number of threads value for each set of task configurations in the plurality of task configurations that have common values for the task parameter value, the dataset parameter value, and the hardware parameter value in association with the common values for the task parameter value, the dataset parameter value, and the hardware parameter value.

2. The non-transitory computer-readable medium of claim 1, wherein determining the optimal number of threads value comprises defining a polynomial equation that is fit to values from each set of task configurations in the plurality of task configurations that have common values for the task parameter value, the dataset indicator, and the hardware indicator, wherein the polynomial equation defines the execution parameter value based on the number of threads value.

3. The non-transitory computer-readable medium of claim 2, wherein the polynomial equation is fit to scaled values of the execution parameter value and of the number of threads value.

4. The non-transitory computer-readable medium of claim 2, wherein the polynomial equation is fit to log base two values of the execution parameter value and to log base two values of the number of threads value.

5. The non-transitory computer-readable medium of claim 1, wherein the execution parameter value is a speedup value computed by dividing the execution runtime value using a respective number of threads value by the execution runtime value using a single thread.

6. The non-transitory computer-readable medium of claim 5, wherein the extremum value is a maximum value.

7. The non-transitory computer-readable medium of claim 1, wherein the execution parameter value is the execution runtime value.

8. The non-transitory computer-readable medium of claim 7, wherein the extremum value is a minimum value.

9. A computing device comprising:
 a processor; and
 a computer-readable medium operably coupled to the processor, the computer-readable medium having computer-readable instructions stored thereon that, when executed by the processor, cause the computing device to
 control execution of a computing task in a computing environment based on each task configuration included in a plurality of task configurations to determine an execution runtime value for each task configuration,
 wherein each task configuration of the plurality of task configurations includes a task parameter value, a dataset indicator, a hardware indicator, and a number of threads value,
 wherein the task parameter value is an input to the computing task,
 wherein the dataset indicator indicates a dataset to use when executing the computing task,
 wherein the hardware indicator indicates an executing computing device in the computing environment used to execute the computing task,
 wherein the number of threads value indicates a number of threads to use to execute the computing task using the executing computing device;
 determine an optimal number of threads value for each set of task configurations in the plurality of task configurations that have common values for the task parameter value, the dataset indicator, and the hardware indicator, wherein the optimal number of threads value is determined as an extremum value of an execution parameter value as a function of the number of threads value;
 determine a dataset parameter value for the dataset;
 determine a hardware parameter value as a characteristic of each distinct executing computing device in the computing environment indicated using the hardware indicator;
 store, in a performance dataset, the determined optimal number of threads value for each set of task configurations in the plurality of task configurations that have common values for the task parameter value, the dataset parameter value, and the hardware parameter value in association with the common values for the task parameter value, the dataset parameter value, and the hardware parameter value;
train a thread determination model to determine a number of threads using the stored performance dataset, wherein the thread determination model is a type of machine learning model; and
output the trained thread determination model.

10. The non-transitory computer-readable medium of claim 1, wherein a type of the machine learning model is selected from the group consisting of a decision tree model type, a gradient boosting tree model type, a random forest model type, a neural network model type, a k-means clustering model type, a factorization machine model type, and a support vector machine model type.

11. The non-transitory computer-readable medium of claim 10, wherein the task parameter value is defined based on the type of the machine learning model.

12. The non-transitory computer-readable medium of claim 1, wherein a type of the machine learning model is a gradient boosting tree model type or a random forest model type, wherein each task configuration of the plurality of task configurations includes a task parameter value for each of a plurality of task parameters, wherein the plurality of task parameters comprises a number of trees and a tree depth.

13. The non-transitory computer-readable medium of claim 1, wherein each task configuration of the plurality of task configurations includes the task parameter value for each of a plurality of task parameters.

14. The non-transitory computer-readable medium of claim 1, wherein the characteristic of each distinct executing computing device in the computing environment is at least one of a number of cores, a central processing unit speed, a random-access memory size, and a cache size.

15. The non-transitory computer-readable medium of claim 1, wherein the dataset parameter value is at least one of a number of attribute variables, a target variable type, a number of nominal variables, and a number of observation vectors included in the dataset.

16. A non-transitory computer-readable medium having stored thereon computer-readable instructions that when executed by a computing device cause the computing device to:
control execution of a computing task in a computing environment based on each task configuration included in a plurality of task configurations to determine an execution runtime value for each task configuration,
wherein each task configuration of the plurality of task configurations includes a task parameter value, a dataset indicator, a hardware indicator, and a number of threads value,
wherein the task parameter value is an input to the computing task,
wherein the dataset indicator indicates a dataset to use when executing the computing task,
wherein the hardware indicator indicates an executing computing device in the computing environment used to execute the computing task,
wherein the number of threads value indicates a number of threads to use to execute the computing task using the executing computing device;
determine an optimal number of threads value for each set of task configurations in the plurality of task configurations that have common values for the task parameter value, the dataset indicator, and the hardware indicator, wherein the optimal number of threads value is determined as an extremum value of an execution parameter value as a function of the number of threads value;
determine a dataset parameter value for the dataset;
determine a hardware parameter value as a characteristic of each distinct executing computing device in the computing environment indicated using the hardware indicator;
store, in a performance dataset, the determined optimal number of threads value for each set of task configurations in the plurality of task configurations that have common values for the task parameter value, the dataset parameter value, and the hardware parameter value in association with the common values for the task parameter value, the dataset parameter value, and the hardware parameter value;
train a thread determination model to determine a number of threads using the stored performance dataset, wherein the thread determination model is a type of machine learning model; and
output the trained thread determination model.

17. The non-transitory computer-readable medium of claim 16, wherein the type of machine learning model is selected from the group consisting of a decision tree model type, a gradient boosting tree model type, a forest model type, a neural network model type, a k-means clustering model type, a factorization machine model type, and a support vector machine model type.

18. The non-transitory computer-readable medium of claim 16, further comprising computer-readable instructions that cause the computing device to:
identify a second task parameter value from a second computing task to train a predictive model;
identify a second dataset parameter value from a training dataset;
identify a second hardware parameter value from a second computing device to execute the second computing task;
execute the trained thread determination model with the identified second task parameter value, the identified second dataset parameter value, and the identified second hardware parameter value to determine a number of threads to use to train the predictive model;
train the predictive model using the determined number of threads on the second computing device with the training dataset; and
output the trained predictive model.

19. The non-transitory computer-readable medium of claim 18, wherein after executing the trained thread determination model and before training the predictive model, the computer-readable instructions further cause the computing device to apply a constraint rule to limit the determined number of threads to a predefined maximum value.

20. The non-transitory computer-readable medium of claim 16, wherein the type of machine learning model is a decision tree model type.

21. The non-transitory computer-readable medium of claim 20, further comprising computer-readable instructions that cause the computing device to:
identify a second task parameter value from a second computing task to train a predictive model;
identify a second dataset parameter value from a training dataset;
identify a second hardware parameter value from a second computing device to execute the second computing task;
execute a ruleset defined from the trained thread determination model with the identified second task parameter value, the identified second dataset parameter value, and the identified second hardware parameter value to determine a number of threads to use to train the predictive model;
train the predictive model using the determined number of threads on the second computing device with the training dataset; and
output the trained predictive model.

22. The non-transitory computer-readable medium of claim 21, wherein the computer-readable instructions further cause the computing device to:
read a new observation vector from a dataset;
input the read new observation vector to the trained predictive model to predict a characteristic value of the read new observation vector; and
output the predicted characteristic value.

23. The non-transitory computer-readable medium of claim 21, wherein after executing the ruleset and before training the predictive model, the computer-readable instructions further cause the computing device to apply a constraint rule to limit the determined number of threads to a predefined maximum value.

24. The non-transitory computer-readable medium of claim 23, wherein the computer-readable instructions further cause the computing device to:
read a new observation vector from a dataset;
input the read new observation vector to the trained predictive model to predict a characteristic value of the read new observation vector; and
output the predicted characteristic value.

25. A computing device comprising:
a processor; and
a computer-readable medium operably coupled to the processor, the computer-readable medium having computer-readable instructions stored thereon that, when executed by the processor, cause the computing device to
control execution of a computing task in a computing environment based on each task configuration included in a plurality of task configurations to determine an execution runtime value for each task configuration,
wherein the computing task is training a machine learning model,
wherein each task configuration of the plurality of task configurations includes a task parameter value, a dataset indicator, a hardware indicator, and a number of threads value,
wherein the task parameter value is an input to the computing task,
wherein the dataset indicator indicates a dataset to use when executing the computing task,
wherein the hardware indicator indicates an executing computing device in the computing environment used to execute the computing task,
wherein the number of threads value indicates a number of threads to use to execute the computing task using the executing computing device;
determine an optimal number of threads value for each set of task configurations in the plurality of task configurations that have common values for the task parameter value, the dataset indicator, and the hardware indicator, wherein the optimal number of threads value is determined as an extremum value of an execution parameter value as a function of the number of threads value;
determine a dataset parameter value for the dataset;
determine a hardware parameter value as a characteristic of each distinct executing computing device in the computing environment indicated using the hardware indicator; and
store, in a performance dataset, the determined optimal number of threads value for each set of task configurations in the plurality of task configurations that have common values for the task parameter value, the dataset parameter value, and the hardware parameter value in association with the common values for the task parameter value, the dataset parameter value, and the hardware parameter value.

26. A method of determining an optimal number of threads for a computer task, the method comprising:
controlling, by a computing device, execution of a computing task in a computing environment based on each task configuration included in a plurality of task configurations to determine an execution runtime value for each task configuration,
wherein the computing task is training a machine learning model,
wherein each task configuration of the plurality of task configurations includes a task parameter value, a dataset indicator, a hardware indicator, and a number of threads value,
wherein the task parameter value is an input to the computing task,
wherein the dataset indicator indicates a dataset to use when executing the computing task,
wherein the hardware indicator indicates an executing computing device in the computing environment used to execute the computing task,
wherein the number of threads value indicates a number of threads to use to execute the computing task using the executing computing device;
determining, by the computing device, an optimal number of threads value for each set of task configurations in the plurality of task configurations that have common values for the task parameter value, the dataset indicator, and the hardware indicator, wherein the optimal number of threads value is determined as an extremum value of an execution parameter value as a function of the number of threads value;
determining, by the computing device, a dataset parameter value for the dataset;
determining, by the computing device, a hardware parameter value as a characteristic of each distinct executing computing device in the computing environment indicated using the hardware indicator; and
storing, by the computing device, in a performance dataset, the determined optimal number of threads value for each set of task configurations in the plurality of task configurations that have common values for the task parameter value, the dataset parameter value, and the hardware parameter value in association with the common values for the task parameter value, the dataset parameter value, and the hardware parameter value.

27. The method of claim 26, wherein determining the optimal number of threads value comprises defining a polynomial equation that is fit to values from each set of task configurations in the plurality of task configurations that have common values for the task parameter value, the dataset indicator, and the hardware indicator, wherein the polynomial equation defines the execution parameter value based on the number of threads value.

28. The method of claim 26, wherein the execution parameter value is a speedup value computed by dividing the execution runtime value using a respective number of threads value by the execution runtime value using a single thread.

29. A method of determining an optimal number of threads for a computer task, the method comprising:
controlling, by a computing device, execution of a computing task in a computing environment based on each task configuration included in a plurality of task configurations to determine an execution runtime value for each task configuration,
wherein each task configuration of the plurality of task configurations includes a task parameter value, a dataset indicator, a hardware indicator, and a number of threads value,
wherein the task parameter value is an input to the computing task,
wherein the dataset indicator indicates a dataset to use when executing the computing task,
wherein the hardware indicator indicates an executing computing device in the computing environment used to execute the computing task,
wherein the number of threads value indicates a number of threads to use to execute the computing task using the executing computing device;
determining, by the computing device, an optimal number of threads value for each set of task configurations in the plurality of task configurations that have common values for the task parameter value, the dataset indicator, and the hardware indicator, wherein the optimal number of threads value is determined as an extremum value of an execution parameter value as a function of the number of threads value;
determining, by the computing device, a dataset parameter value for the dataset;
determining, by the computing device, a hardware parameter value as a characteristic of each distinct executing computing device in the computing environment indicated using the hardware indicator;
storing, by the computing device, in a performance dataset, the determined optimal number of threads value for each set of task configurations in the plurality of task configurations that have common values for the task parameter value, the dataset parameter value, and the hardware parameter value in association with the common values for the task parameter value, the dataset parameter value, and the hardware parameter value;
training, by the computing device, a thread determination model to determine a number of threads using the stored performance dataset, wherein the thread determination model is a type of machine learning model; and
outputting, by the computing device, the trained thread determination model.

30. The method of claim 29, further comprising:
identifying, by the computing device, a second task parameter value from a second computing task to train a predictive model;
identifying, by the computing device, a second dataset parameter value from a training dataset;
identifying, by the computing device, a second hardware parameter value from a second computing device to execute the second computing task;
executing, by the computing device, the trained thread determination model with the identified second task parameter value, the identified second dataset parameter value, and the identified second hardware parameter value to determine a number of threads to use to train the predictive model;
training, by the computing device, the predictive model using the determined number of threads on the second computing device with the training dataset; and
outputting, by the computing device, the trained predictive model.

* * * * *